United States Patent [19]

Bratslavskaya et al.

[11] 4,093,792
[45] June 6, 1978

[54] COPOLYMERIZATION PRODUCT OF N-VINYLMETHYLPYRAZOLE AND DIVINYL CROSS-LINKING AGENT AND METHOD OF PREPARING SAME

[76] Inventors: Alla Lvovna Bratslavskaya, ulitsa Zheleznodorozhnaya, 25a, kv. 38, Krasnogorsk Moskovskoi oblasti; Serafima Borisovna Makarova, prospekt Mira, 184, kv. 45, Moscow; Roman Yakovlevich Mushy, ulitsa Lisichanskaya, 45, kv. 15, Severodonetsk Voroshilovogradskoi oblasti; Galina Vladimirovna Myasoedova, ulitsa Fertsmana, 7, kv. 98; Sergei Borisovich Savvin, Pervaya ulitsa Stroitelei, 11, korpus 1, kv. 157, both of, Moscow; Vera Ivanovna Seraya, ulitsa Gagarina, 56, kv. 42, Severodonetsk Voroshilovogradskoi oblasti, all of U.S.S.R.

[21] Appl. No.: 711,506

[22] Filed: Aug. 3, 1976

[51] Int. Cl.² .................. C08F 212/36; C08F 218/14; C08F 220/20; C08F 226/06
[52] U.S. Cl. .................................... 526/200; 526/202; 526/219; 526/232; 526/263
[58] Field of Search ............... 526/263, 202, 200, 219, 526/232

[56] References Cited

U.S. PATENT DOCUMENTS

| | | | |
|---|---|---|---|
| 3,063,978 | 11/1962 | Lynn | 526/263 |
| 3,718,631 | 2/1973 | Grosmangin et al. | 526/202 |

*Primary Examiner*—Harry Wong, Jr.
*Attorney, Agent, or Firm*—Haseltine, Lake & Waters

[57] ABSTRACT

In accordance with the present invention, a copolymerization product of N-vinylmethylpyrazole with a divinyl cross-linking agent has the following formula of its elemental unit:

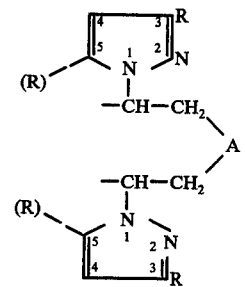

wherein R is $CH_3$ in the position 3 or 5; A is a divinyl cross-linking agent, viz. divinylbenzene, diallylmaleate, ethyleneglycol dimethacrylate, diethyleneglycol dimethacrylate, triethyleneglycol dimethyacrylate; it has a sorption capacity with respect to the platinum group metals and silver: $E_{Au}$ = 420 to 785 mg/g of the sorbent $E_{Ag}$ = 320 to 450 mg/g of th sorgent, $E_{Pd}$ = 130 to 170 mg/g of th sorbent, $E_{Pt}$ = 180 to 230 mg/g of the sorbent and a swelling factor in water of 2 to 4 ml/g. The method for preparing said copolymerization product of N-vinyl methylpyrazole with a divinyl cross-linking agent according to the present invention comprises reacting N-vinylmethylpyrazole of the formula:

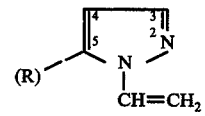

wherein R is $CH_3$ in the position 3 or 5, with a divinyl cross-linking agent, viz. divinylbenzene, diallylmaleate, ethylenglycol dimethacrylate, di ethyleneglycol dimethacrylate, triethyleneglycol dimethacrylate in the pesence of a radicaltype initiator at 70°–100° C in a suspension medium, followed by isolation of the desired product.

7 Claims, No Drawings

COPOLYMERIZATION PRODUCT OF N-VINYLMETHYLPYRAZOLE AND DIVINYL CROSS-LINKING AGENT AND METHOD OF PREPARING SAME

The present invention relates to a novel compound, viz. a copolymerization product of N-vinylmethylpyrazole with a divinyl cross-linking agent and to a method of preparing same.

The copolymerization product according to the present invention is useful as a sorbent selective with respect to platinum-group elements and silver.

This copolymerization product has not been hitherto described in the literature.

In accordance with the present invention, the copolymerization product of N-vinylmethylpyrazole with a divinyl cross-linking agent has an elemental unit of the formula:

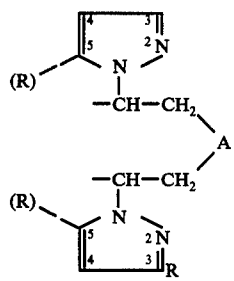

wherein R is $CH_3$ in the position 3 or 5; A is a divinyl cross-linking agent, viz. divinylbenzene, diallylmaleate, ethyleneglycol dimethacrylate, diethyleneglycol dimethacrylate, triethyleneglycol dimethacrylate, having a sorption capacity with respect to platinum-group elements and silver as follows:

$E_{Ag}$ = 320 to 450 mg/g of the sorbent;
$E_{Au}$ = 420 to 785 mg/g of the sorbent;
$E_{Pt}$ = 180–230 mg/g of the sorbent;
$E_{Pd}$ = 130 to 170 mg/g of the sorbent.

$E_{Ag}$ — sorption capacity with respect to silver;
$E_{Au}$ — sorption capacity with respect to gold;
$E_{Pt}$ — sorption capacity with respect to platinum;
$E_{Pd}$ — sorption capacity with respect to palladium, and having a swelling factor in water of from 2 to 4 ml/g.

The copolymerization product comprises white granules of spherical shape; it is insoluble, though swellable in acids and in organic solvents, but sparingly swellable in water.

This copolymerization product according to the present invention features a clearly pronounced selectivity with respect to platinum-group elements and to silver as well as a high sorption capacity.

In the test performed with the copolymerization product according to the present invention for sorption to elements of the platinum group and silver, the following results have been obtained; with respect to gold, from a 1N solution of HCl, $E_{Au}$=420–785 mg/g of the sorbent; with respect to silver, from a 1N solution of HCl, $E_{Ag}$ = 320 to 450 mg/g of the sorbent; with respect to palladium, from a 1N solution of HCl, $E_{Pd}$ = 130–170 mg/g of the sorbent; with respect to platinum, from a 1N solution of HCl, $E_{Pt}$ = 180–230 mg/g of the sorbent.

The elements were determined by spectrophotometric techniques.

The sorbent also features a content of nitrogen within the range of from 21 to 24.5 by weight and a swelling factor in water of from 2 to 4 mg/g of the sorbent.

In accordance with the present invention, the method of preparing said copolymerization product comprises reacting N-vinylmethylpyrazole of the formula:

wherein R is $CH_3$ in the position of 3 or 5.

With a divinyl cross-linking agent, viz. divinylbenzene diallylmaleate, ethyleneglycol dimethacrylate, diethyleneglycol dimethacrylate or triethyleneglycol dimethacrylate in the presence of a radical-type or peroxide-type initiator at a temperature within the range of from 70° to 100° C in a suspension medium, followed by isolation of the desired product.

It is advisable that as the radical-type initiator use be made of azo-isobutyric acid dinitrile or benzoyl peroxide.

It is preferable to employ, as the suspension medium, an aqueous solution of polyvinyl alcohol or an aqueous solution of starch.

The method of preparing said copolymerization product of N-vinylmethylpyrazole with a divinyl cross-linking agent is conducted in the following manner.

The polymerization initiator of a radical type, preferably azo-isobutyric acid dinitrile or benzoyl peroxide, is dissolved in N-vinyl-3/5/-methylpyrazole and the resulting solution is mixed with one of the above-mentioned divinyl cross-linking agent.

Thereafter, the thus-prepared mixture is dispersed in a suspending medium, preferably in an aqueous solution of polyvinyl alcohol or aqueous solution of starch. The copolymerization process is conducted at a temperature within the range of from 70° to 100° C.

The resulting copolymerization product is washed with water and then with acetone to remove the unreacted monomers.

The copolymerization product is dried in a drying cabinet at a temperature within the range of from 60° to 70° C to a constant weight for a period of 4 to 5 hours.

For better understanding of the present invention, some specific Examples illustrating the method according thereto are given hereinbelow.

EXAMPLE 1

Into a three-neck flask provided with a stirrer, reflux condenser and thermometer there are charged 50 ml of a 5% aqueous solution of polyvinyl alcohol. Then, a preliminary prepared mixture of 10.2 ml (10 g) of N-vinylmethylpyrazole, 0.1 g of azo-isobutyric acid dinitrile and 0.2 g of divinylbenzene is dispersed therein. Temperature conditions of the copolymerization reaction are as follows: 70° C — 2 hours; 80° C — 3 hours; 100° C — 2 hours.

The final product is washed with water to remove polyvinyl alcohol and then with water to remove the unreacted monomers. The sorbent is dried in a drying cabinet at a temperature within the range of from 60° to 70° C to a constant weight. $E_{Ag}$ = 450 mg/g of the sorbent; $E_{Au}$ = 785 mg/g of the sorbent. Nitrogen content 21-24.5% by weight. Swelling factor in water is 3±0.5 ml/g.

EXAMPLE 2

Into a three-neck flask provided with a stirrer, reflux condenser and thermometer, there are charged 50 ml of a 5% aqueous solution of polyvinyl alcohol. Then, a preliminary prepared mixture of 10.2 ml (10G) of N-methylvinylpyrazole 0.1 g of azo-isobutyric acid dinitrile and 0.52 g of diallyl-maleate is dispersed therein. Temperature conditions of the copolymerization reaction are as follows: 70° C — 1 hour; 80° C — 4 hours; 100° C — 2 hours.

Further treatment of the copolymer is performed in a manner similar to that described in Example 1 hereinbefore. $E_{Ag}$ = 320 mg/g of the sorbent; $E_{Au}$ = 450 mg/g of the sorbent. Nitrogen content 21-24% by weight.

EXAMPLE 3

Into a three-neck flask provided with a stirrer, reflux condenser and a thermometer, there are charged 50 ml of a 5% aqueous solution of polyvinyl alcohol. Then, a previously prepared mixture of 10.2 ml (10 g) of N-vinylethylpyrazole, 0.1 g of azo-isobutyric acid dinitrile and 0.52 g of triethyleneglycol dimethacrylate is dispersed therein.

Temperature conditions of the copolymerization reaction are as follows: 60° C — 2 hours; 80° C — 5 hours.

Further treatment of the copolymer is conducted in a manner similar to that described in Example 1 hereinabove. $E_{Ag}$ = 320 mg/g of the sorbent; $E_{Au}$ = 420 mg/g of the sorbent. Nitgrogen content is 22-24% by weight. Swelling factor in water is 2 ml/g.

EXAMPLE 4

Into a three-neck flask provided with a stirrer, reflux condenser and thermometer, there are charged 50 ml of a 5% aqueous solution of polyvinyl alcohol. Therein, a previously prepared mixture of 10.2 ml (10 g) of N-vinylmethylpyrazole 0.1 g of azo-isobutyric acid dinitrile and 0.52 g of ethyleneglycol dimethacrylate is dispersed therein. Temperature conditions of the copolymerization reaction are as follows: 60° C — 2 hours, 80° C — 5 hours.

Further treatment of the copolymer is conducted in a manner similar to that described in the foregoing Example 1. $E_{Ag}$ = 340 mg/g of the sorbent; $E_{Au}$ = 420 mg/g of the sorbent Nitrogen content is 22-24% by weight. Swelling factor in water is 2.5 ml/g.

EXAMPLE 5

Into a three-neck flask provided with a stirrer, reflux condenser and thermometer there are charged 50 ml of a 5% aqueous solution of starch. Then, a previously prepared mixture of 10.2 ml (10 g) of N-ethylvinyl-pyrazole, 0.1 g of azo-isobutyric acid dinitrile and 0.2 g of diethyleneglycol dimethacrylate. Temperature conditions of the copolymerization reaction are as follows: 60° C — 2 hours; 80° C — 5 hours.

Further treatment of the copolymer is conducted in a manner similar to that described in the foregoing Example 1. $E_{Au}$ = 420 mg/g of the sorbent. $E_{Ag}$ = 320 mg/g of the sorbent. Nitrogen content is 21-24% by weight. Swelling factor in water is 2 ml/g.

EXAMPLE 6

Into a three neck flask provided with a stirrer, reflux condenser and thermometer there are charged 50 ml of a 5% aqueous solution of polyvinyl alcohol. Then, a previously prepared mixture of 10.2 ml (10 g) of N-vinylmethylpyrazole, 0.1 g of benzoyl peroxide and 0.52 g of divinylbenzene is dispersed therein. Temperature conditions of the copolymerization reaction are as follows: 70° C - 2 hours, 80° C - 3 hours, 100° C - 2 hours. Further treatment of the copolymer is conducted in a manner similar to that described in Example 1 hereinabove. $E_{Ag}$=450 mg/g of the sorbent; $E_{Au}$=785 mg/g of the sorbent. Nitrogen content is 21-24.5% by weight. Swelling factor in water is 3±0.5 ml/g.

What is claimed is:

1. A copolymerization product of N-vinylmethyl-pyrazole with a divinyl cross-linking agent said product having an elemental unit of the formula:

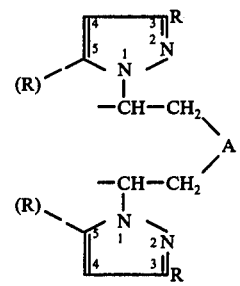

wherein R is a CH$_3$ radical in the position 3 or 5, A is a divinyl cross-linking agent selected from the group consisting of divinylbenzene, diallylmaleate, ethyleneglycol dimethacrylate, diethyleneglycol dimethacrylate and triethyleneglycol dimethacrylate and said product having a sorption capacity, in respect of platinum-group elements and silver of $E_{Au}$=420 to 785 mg/g of the sorbent, $E_{Ag}$= 320 to 450 mg/g of the sorbent, $E_{Pd}$ = 130 to 170 mg/g of the sorbent, $E_{Pt}$ = 180 to 230 mg/g of the sorbent and a swelling factor in water of 2 to 4 ml/g.

2. A method of preparing a copolymerization product of N-vinylmethylpyrazole with divinyl cross-linking agent said product having an elemental unit of the formula:

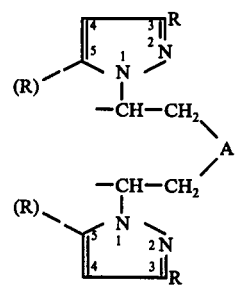

wherein R is a CH$_3$ radical in the position 3 or 5, A is a divinyl cross-linking agent selected from the group consisting of divinylbenzene, diallylmaleate, ethyleneglycol dimethacrylate, diethyleneglycol dimethacrylate and triethyleneglycol dimethacrylate, comprising reacting N-vinylmethylpyrazole of the formula:

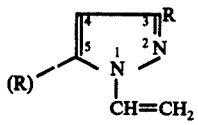

wherein R is a CH₃ radical in the position 3 or 5, with a divinyl cross-linking agent selected from the group consisting of divinylbenzene, diallymaleate, ethleneglycol dimethacrylate, diethyleneglycol dimethacrylate and triethyleneglycol dimethacrylate in the presence of a radical-type initiator at a temperature within the range of from 70° to 100° C in a suspension medium, followed by isolation thereof and said product having a sorption capacity, in respect of platinum-group elements and silver of $E_{Au}$=420 to 785 mg/g of the sorbent, $E_{Ag}$=320 to 450 mg/g of the sorbent, $E_{Pd}$=130 to 170 mg/g of the sorbent, $E_{Pt}$=180 to 230 mg/g of the sorbent and a swelling factor in water of 2 to 4 ml/g.

3. A method of preparing a copolymerization product according to claim 2, wherein the radical-type initiator is selected from the group consisting of azo-iso-butyric acid dinitrile and benzoyl peroxide.

4. A method of preparing a copolymerization product according to claim 2, wherein the suspension medium is an aqueous starch solution.

5. A method of preparing a copolymerization product according to claim 2, wherein the suspension medium is an aqueous solution of polyvinyl alcohol.

6. The copolymerization product according to claim 1 wherein the content of the pyrazole and cross-linking agent is 98 and 2 wt. percent, respectively, or is 95 and 5 wt. percent, respectively.

7. The method according to claim 2 wherein the content of the pyrazole and cross-linking agent is 98 and 2 wt. percent, respectively, or is 95 and 5 wt. percent, respectively.

* * * * *